Aug. 27, 1957  F. P. HARTHMAN ET AL  2,804,601
COUPLING DEVICES FOR ELECTRIC CABLES
Filed June 8, 1954  2 Sheets-Sheet 1
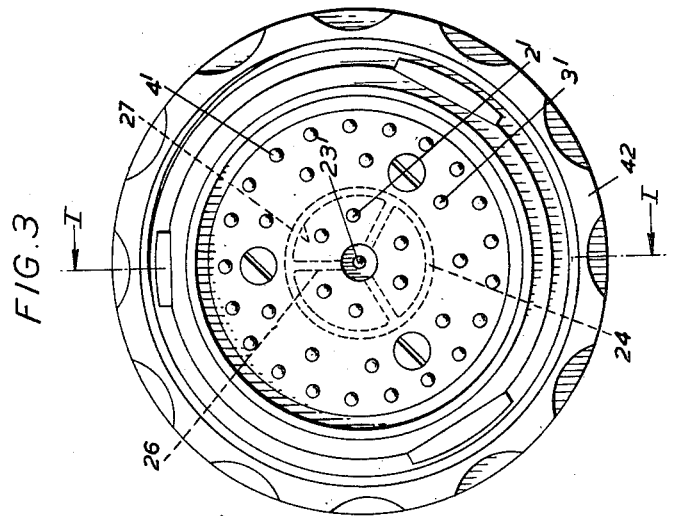
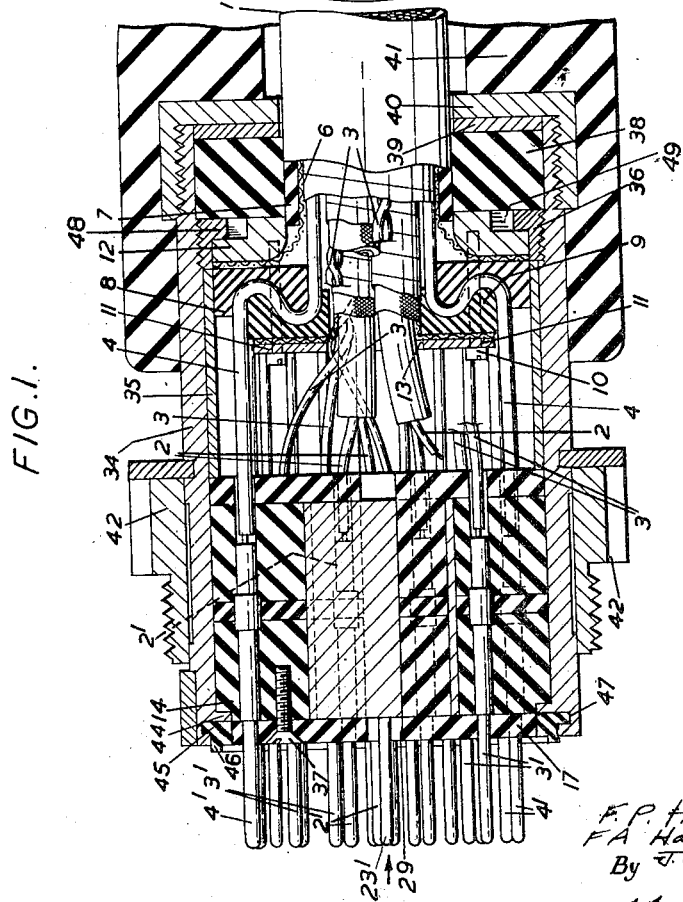
Inventor
F. P. Harthman
F. A. Harwood
By J. C. Balmforth
Webb—Mackey & Burden
Attorney Aug. 27, 1957  F. P. HARTHMAN ET AL  2,804,601
COUPLING DEVICES FOR ELECTRIC CABLES
Filed June 8, 1954  2 Sheets-Sheet 2
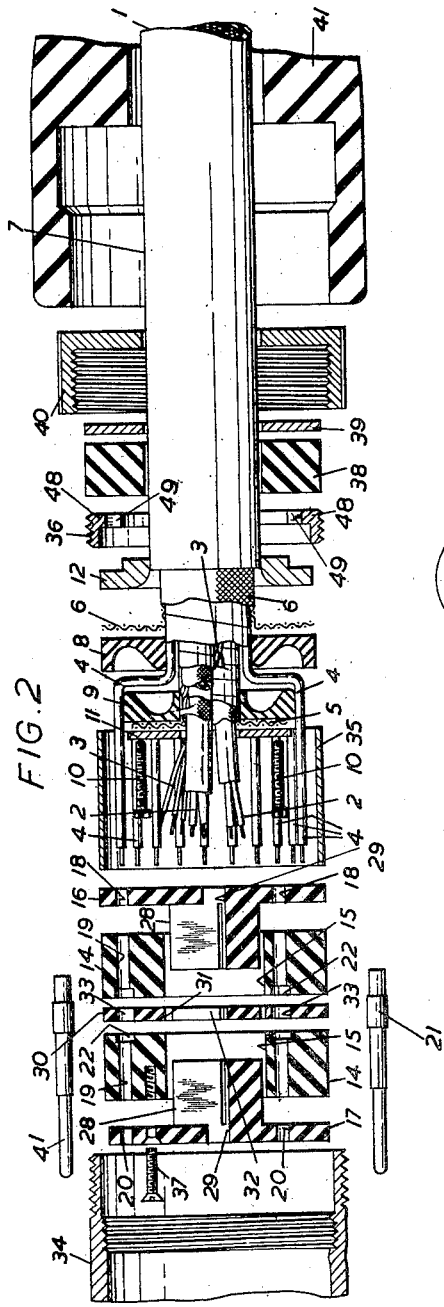
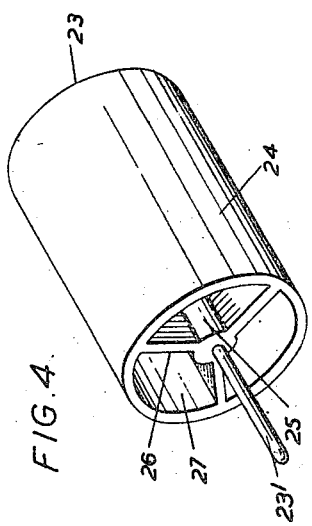
Inventor
F. B. Harthman
F. A. Harwood
By J.C. Balmforth
Witt, Mackey & Burdess
Attorney

United States Patent Office 2,804,601
Patented Aug. 27, 1957

2,804,601

COUPLING DEVICES FOR ELECTRIC CABLES

Francis Peter Harthman, Liverpool, Frederick Arthur Harwood, Maghull, near Liverpool, and John Chalmer Balmforth, Ormskirk, Lancashire, England, assignors to British Insulated Callender's Cables Limited, London, England, a British company Application June 8, 1954, Serial No. 435,312

Claims priority, application Great Britain July 3, 1953

2 Claims. (Cl. 339—143)

This invention relates to electric cable coupling devices as used for making electrical connections between two lengths of electric cable embodying a large number of conductors. The coupling device embodies a number of contact members corresponding to the number of cable conductors, one contact member being electrically connected to the bared end of each of the cable conductors. The contact members are brought into engagement with those of another coupling device attached to an end of a length of electric cable by a relative endwise movement of approach of the two coupling devices or sets of contact members to make the necessary electrical connections between the two lengths of electric cable. One coupling device may embody contact members having the form of pins for entry into contact members of the outer coupling device having the form of sockets. Each coupling device may embody, however, both forms of contact member or each coupling device may have contact members in the form of pins which when brought into engagement may make end to end abutting contact. After the contact members have been brought into engagement the two coupling devices are held together mechanically in order to prevent accidental disengagement of the contact members.

As an example of a type of cable having a large number of cable conductors may be mentioned the type used with television cameras. In such cables there may be as many as thirty six cable conductors as well as screening devices requiring to be earthed. The cable conductors are individually insulated and are laid up within the cable forming two or more concentric layers. The conductors are intended to form parts of different circuits and those in one layer are of different diameter from those of another according to the function of the circuit. One layer, for instance, may be formed of power conductors of relatively large diameter and those of another layer may consist of conductors used for communication purposes and made of relatively small diameter wires. Coupling devices used with such cables are subjected to considerable longitudinal tension and to other conditions of rough treatment with the result that some of the conductors, usually the thinner ones, or the connections made between the conductors and the contact members housed within the coupling device, become broken. In such cases the old coupling device can be cut off from the end of the cable and replaced by a new one or the old one can be taken to pieces and the parts used again. In either case, however, special equipment is required for the assembly of the parts of the new or of the old coupling device.

By the present invention we provide an improved construction of coupling device having parts which can be readily assembled and taken apart when required without the necessity for using any special equipment and which at the same time can be securely attached to the cable.

According to the invention a coupling device adapted to be attached to an end of an electric cable comprises an insulating mounting for the cable conductors and an outer casing which houses the mounting and a cylindrical sleeve which is pressed towards the mounting. The outer casing is adapted to surround the end of the cable and project beyond it and the insulating mounting is housed within the projecting portion of the outer casing adjacent the end thereof and is prevented from axial movement therein by the cylindrical sleeve which is slidably mounted within the outer casing and is interposed between the insulating mounting and a ring pressing the sleeve towards the mounting. The cable conductors extend beyond the end of the cable through the sleeve into the insulating mounting where they are electrically connected to the contact members and the latter are housed within the insulating mounting and are prevented from endwise movement relative to the mounting when the sleeve is pressed towards the mounting. A clamp for some of the conductors may be housed within the sleeve, the clamp being of annular form and surrounding the end of the cable, the ring for pressing the sleeve towards the mounting for the cable contacts serving also to prevent axial movement of the clamp in the direction of the cable, the ring being disposed around the cable on the cable side of the clamp and screwing into the outer casing.

An illustrative example of one form of construction of coupling device according to the invention will now be described with reference to the accompanying drawings wherein:

Figure 1 is a longitudinal section of a completed coupling device, the section being on the line I—I of Figure 3 looking in the direction of the arrows and with some parts shown broken away.

Figure 2 is a view similar to that shown in Figure 1 but showing the various parts of the coupling device before assembly and drawn to a smaller scale.

Figure 3 is an end elevation of Figure 1 locking in the direction of the arrow and Figure 4 is a perspective view of a detail drawn to an enlarged scale.

It will be convenient to describe first of all the construction of the electric cable insofar as it is necessary for the understanding of the invention. The cable 1 shown in Figures 1 and 2 is intended for use with a television camera and has in all thirty six conductor wires. Many of these have been omitted to avoid obscuring the drawings. Each wire is insulated with polyethylene. There are six inner wires 2 disposed adjacent the longitudinal axis of the cable, nine intermediate wires 3 and twenty one outer wires 4.

The six inner wires 2 consist of three pairs, the wires of each pair being twisted together and around each pair is a tubular metal braid screen 5. The three screened pairs are twisted together. The nine intermediate wires 3 form three groups, the wires of each group being parallel with each other. They occupy the helical spaces formed between the three screened twisted pairs. These inner and outer wires form together a substantially cylindrical body over which there are the outer wires 4 which lie side by side and occupy helical paths along the length of the cable. The outer wires 4 are enclosed in an outer tubular metal braid 6 and immediately over the latter is placed a sheath 7 of polyvinyl chloride. The inner and intermediate wires are of substantially smaller diameter as compared with the outer wires 4.

The coupling device, which can be firmly secured to the end of an electric cable, consists of parts which can be assembled and taken apart without any special form of equipment but by the use of simple and readily available tools. Some of these parts also provide for the protection of the weaker wires against breaking under tensile stresses to which the coupling device may be subjected when in use and other parts provide for the effective sealing of the coupling device against the entry of moisture into the interior thereof.

In order to protect the relatively thin inner and intermediate wires against breakage under tension, it is arranged that longitudinal tension applied to the wires should be taken up by the outer layer of thicker wires 4 which are firmly held in position by two clamping members 8 and 9.

These have the form of rings which are so shaped as to fit into each other and to give to each of the insulated outer wires an S-shaped bend. The two clamping members are placed near the end of the cable 1 and positioned so that the outer wires 4 approach and leave the clamping members in substantially straight paths, the absence of sharp bends in the portions of the wires clamped avoiding the risk of damaging the wires by the clamping members. The clamping together of the two members 8 and 9 is effected by screws 10 passing freely through holes in a metal plate 11 and through holes in the two clamping members and entering tapped holes in a metal ring 12 surrounding the cable 1 adjacent its end.

The earthing of the screens 5 surrounding the inner wires 2 is provided for by clamping the teased out ends of the screens between the metal plate 11 which has a central hole 13 so that it may be placed over the screens 5, and the clamping member 9, the conducting connection from the screens being provided from the plate 11 through the screws 10 to the metal ring 12. An earthing connection is also provided for the outer screen 6 by anchoring teased out ends of the screen between the metal ring 12 and the clamping member 8.

As will be seen from Figure 1 the axially disposed metal plate 11 is of about the same diameter as that of the adjacent clamping member 9, and that both are of substantially smaller diameter than the clamping member 8. This enables the outer wires 4 to be taken forward in straight paths over the edge of the plate 11.

In the cable 1 the insulated outer wires 4 lie side by side but around the periphery of the clamping member 9 they are spaced apart substantially uniformly.

The clamping members 8 and 9 are made of insulating material.

The end of each wire is soldered to the adjacent end of a contact member. In the drawings the latter are shown as having the form of plugs or pins and for the sake of brevity are referred to hereafter as "pins." Some of these are shown in Figures 1 and 2 but in Figure 3, the ends of all of them are shown and from that figure the relative positions of the pins for the inner, intermediate and outer wires can be seen, the reference numerals 2', 3' and 4' indicating respectively the pins for the inner, intermediate and outer wires.

The construction and arrangement of the parts now to be described are shown most clearly in Figure 2, to which reference will be made. The supporting of all the pins and the housing of the soldered connections made between the pins and wires is effected by two rings 14 each having a central aperture 15 and each of substantial radial thickness and width, the two rings being held between a back plate 16 and a front plate 17 each made of insulating material. The rings 14 and back and front plates may be, for example, of ebonite.

The ends of all the wires are bared for an appropriate distance and the bared ends are threaded through appropriately positioned holes 18 in the back plate 16, and are soldered to the rear ends of the appropriate pins. The rings 14 and the front plate 17 have appropriately positioned passages 19 and 20 respectively to receive the pins. The arrangement is such that when the two rings 14 and the back plate 16 and front plate 17 are assembled, the passages and holes in those members register for the supporting of the pins and the housing of the connections made between the pins and the wires. When the parts are assembled the pins are located in position by the engagement of enlarged portions 21 in recesses 22 formed partly in each of the rings 14.

In Figure 4 there is shown a screening device 23 which is designed to screen the three pairs of inner wires 2 from each other where they are connected to their pins 2' and to screen those portions of the corresponding pairs of pins housed within the insulating rings 14. The screening device consists of a metal cylinder 24 having an axially disposed cylindrical rod 25, the cylinder and the rod being connected by three radially extending webs 26 extending the full length of the cylinder so as to divide the cylinder into three substantially sector-shaped compartments 27 of equal area in cross-section. This screen 23 is embodied in the coupling device and has a forwardly extending centrally disposed pin 23'.

The back plate 16 and front plate 17 are each provided with three sector-shaped projections 28 spaced apart by 120° and adapted to fit into the compartments 27 of the screen 23 and make a relatively close fit therewith. The projections are of insulating material and are integrally formed with their respective plates. As will be seen from Figure 2, when the parts are assembled, the projections of the front plate 17 extend rearwardly and those of the back plate 16 extend forwardly. The screen 23 is supported in position by the projection 28, the cylindrical part 24 of the screen lying between those projections and the adjacent inner surfaces of the rings 14 which define the apertures 15. The radially disposed webs 26 occupy the radially disposed passages provided between the projections 28 and the axially disposed rod 25 of the screen occupies similarly shaped passages formed between the projections 28. These passages are continued as apertures 29 in the back plate 16 and front plate 17. The pin 23' extends through the aperture 29 in the front plate 17 for entry into a socket in another coupling device. When the screen 23 is placed in position it is surrounded both externally and internally by insulating material. It is also surrounded by insulating material at each end thereof. As will be understood each of the projections 28 is formed with a pair of appropriately spaced passages extending longitudinally through each to receive the ends of the inner wires 2 and the pins 2' connected thereto. One of these pins is indicated in broken lines in Figure 1.

The screen 23 can be earthed by connecting a wire (not shown) to its rear end and clamping the free end of the wire beneath the head of one of the screws 10.

In order to minimise the risk of entry of moisture into the coupling device through its forward end, there are provided sealing members. These consist of a rubber ring 30 having a central aperture 31 and three sector-shaped members 32 also of rubber or similar resilient material. When the parts are in position the ring 30 surrounds closely the cylinder 24 of the screen 23 and the sector-shaped sealing members 32 lie within the inner ends of the compartments 27 and are disposed between the corresponding ends of the projections 28. Both the rubber ring 30 and the sector-shaped sealing members 32 have apertures to permit the free passage of the appropriate pins. In Figure 2 there are shown at 33 two of the apertures extending through the rubber ring 30. The sealing becomes effective when the sleeve 35 is pressed against the rear plate 16 by the ring 36, the axial pressure imposed on the sealing members 30 and 32 causing in them a tendency to extend laterally, thereby forcing them into tight contact with the adjacent metal parts.

The rings 14 and the back plate 16 make a sliding fit within an outer cylindrical metal casing 34 having adjacent its front end an inwardly extending annular flange 44 which provides an abutment for the adjacent ring 14. Within the outer casing 34 there also slidably fits a cylindrical metal distance sleeve 35, its front end being adapted to bear against the back plate 16 to press it and the two rings 14 towards the left in the view shown in Figure 1, the front ring 14 being caused to abut against the inwardly extending annular flange 44. Housed within the outer casing 34 is a ring 36 which screws into the outer casing adjacent its rear end to cause the distance sleeve 35 to press the front ring 14 against the flange 44 and the two rings 14 tightly together. The front plate 17 is attached to the adjacent front ring 14 by screws 37 passing through the plate and entering tapped holes in the adjacent ring.

When the two rings 14 and the back plate 16 and front plate 17 are in position in the outer casing 34 with the pins occupying the registering passages in those parts and the sealing ring 30 is disposed between the two rings 14 and the sector-shaped sealing members 32 are interposed between the projections 28, the ring 36 can be screwed into the outer casing 34 to cause the distance sleeve 35 to press hard against the back plate 16. When this occurs, the outer part of the back plate is pressed against the adjacent rear ring 14 and the sealing ring 30 is pressed tightly against the inner surface of the outer casing 34 and against the enlarged portions 21 of those pins extending through the sealing ring and the latter is also pressed against the cylindrical portion 24 of the screen 23. In addition, the sector-shaped sealing members 32 are pressed against the adjacent surfaces of the compartments 27 of the screen 23 and against the enlarged portions 21 of those pins extending through the sector-shaped sealing members. In addition, the enlarged portion 21 of each pin is housed in its recess 22, the enlarged portions being engaged by the adjacent parts of the recesses. The forward part of the coupling device is thus sealed against the entry of moisture and the pins are located against axial movement in their passages. The engaging parts of the pins 2', 3' and 4' extend through appropriately disposed apertures in the front plate 17 to the outside thereof, the pins making a fairly close fit in those apertures. The pins may have projections 49 (see Figure 2) which are engaged by the front plate 17 to assist in preventing axial movement of the pins relative to the rings 14 in the forward direction.

To minimise the risk of entry of moisture at the rear end of the coupling, there is provided a rubber ring 38 which is of substantial radial thickness and of substantial width. A rear back plate 39 is pressed against the rubber ring 38 by a ring 40 which screws on to the rear end of the outer casing 34. The rubber ring 38 surrounds the cable sheath 7 and is forced into tight contact therewith and with the inner surface of the outer casing adjacent its end and with the rings 12 and 36, upon tightening up the ring 40, thereby sealing the coupling device at its rear end against the entry of moisture.

The various parts of the coupling device may be assembled and the coupling device attached to the end of the cable 1 in the following manner, it being assumed that the clamping members 8 and 9 and the other parts of the coupling device shown to the right of the clamping members in Figure 2 have been threaded over the end of the cable and occupy the positions shown in that Figure. The necessary parts of the cable are cut back to expose for an appropriate length the insulated wires 2, 3 and 4 and the outer screen 6 and the inner screen 5. The outer insulated wires 4 are laid around the periphery of the clamping member 9, the ends of the screens 5 and 6 being teased out and the ends twisted together, the ends of the outer screen 6 being placed between the clamping member 8 and the metal ring 12 and the ends of the inner screen being between the metal plate 11 and the clamping member 9. These parts can then be held together by the screws 10.

The insulation is then removed from the wires for an appropriate length and the wires inserted through the holes in the back plate 16 and through the passages in the projections 28 integral with that plate and through the passages in the adjacent ring 14. The wires can then be cut off substantially flush with the front faces of that ring 14 and those projections 28 and then be provided with a blob of flux. The pins can now be attached to the ends of their respective wires by placing solder in the ends of the pins, heating the pins and inserting them into the passages in the adjacent ring 14 and thereby soldering the pins to the ends of the wires.

The screen 23 can now be placed over the projection 28 integral with the back plate 16 and an earth wire connected at one end to the rear end of the screen, the other end being placed under the head of one of the screws 10 and the latter tightened up.

The sealing members 30 and 32 can now be placed in position by threading them over the appropriate pins. The front ring 14 and the front plate 17 attached thereto are now threaded over the ends of the pins. As the distance sleeve 35 surrounds all the forwardly extending ends of the cable conductors, it may be moved out of the way when clamping the outer cable conductors in position and clamping the outer ends of the inner and outer screens 5 and 6 respectively. During these operations the sleeve 35, for example, may surround the cable 1 being moved towards the right in the view shown in Figure 2. After the completion of these operations and after the ends of the conductors have been soldered to their respective pins, the sleeve 35 can be moved to bring its rear end over the clamping member 8, when the latter will support the sleeve. The outer casing 34 can now be moved towards the end of the cable 1 to bring its inwardly extending flange 44 against the front ring 14 and so that it extends over both rings 14, the rear plate 16 and the distance sleeve 35 and so that its rear end surrounds the end of the cable 1. The screw threaded ring 36 can then be screwed into the rear part of the outer casing 34 so as to force the sleeve 35 tightly against the rear plate 16 and to hold the ring 12 and the clamp attached thereto against axial movement in the direction of the cable, an annular flange 48 integral with the ring 36 bearing against the outer part of the ring 12. Slots 49 in the annular flange facilitate turning of the ring by a suitable tool. The rubber ring 38 and rear plate 39 can now be placed in position and that end of the coupling device sealed by screwing the ring 40 on to the adjacent end of the outer casing 34. A rubber ring 46 is fitted round the periphery of the front plate 17 and projects forwardly for a short distance beyond the adjacent end of the outer casing 34, the ring 46 having an outwardly extending flange 45 fitting into a recess 47 in the outer casing. The ring 46 provides an abutment when the pins are brought into engagement with the contact members of another coupling device. A rubber protecting sleeve 41 through which the end of the cable extends can be sprung over the rear end of the coupling device.

The two rings 14 and the back plate 16 and the distance sleeve 35 make a sliding fit in the outer casing 34, the sleeve 35 being interposed between the back plate 16 and the ring 36 screwing into the outer casing adjacent the rear end of the latter. The clamping member 8 makes a sliding fit in the distance sleeve 35 and the ring 12 surrounding the cable adjacent the place where the sheath 7 is cut back makes a sliding fit within the ring 36. The latter when tightened up forces the distance sleeve 35 against the back plate 16 to locate the latter and the rings 14 within the outer casing 34 and the pins disposed in the passages in the two rings. The pins disposed in the passages in the projections 28 are located in those passages by the distance sleeve 35 acting in conjunction with the front plate 17. All the cable conductors extend forwardly from the cable 1 through the distance sleeve 35 and the outer conductors of larger cross-section are clamped in position so as to relieve the inner conductors of smaller diameter of longitudinal stresses and thereby minimise the risk of failure of the coupling device due to the fracture of the smaller conductors under the tensile stresses to which the device is subjected when in use.

The completed coupling device can be mechanically connected to a similar one, but provided with sockets receiving the pins 2', 3' and 4', by a coupling ring 42 rotatable on the sleeve 34 but capable of limited longitudinal movement only.

In the construction of coupling device as described, provision is made for insulating in appropriate spaced relationship a large number of cable contacts and for retaining them firmly in the desired relationship within a comparatively small area of cross-section, for relieving thinner conductors of longitudinal tensile stresses, for obtaining earthing and continuity of screening and for the embodying of a screening device within the coupling device itself. Provision is also made for the effective sealing of the coupling device against the entry of moisture into the interior thereof. All these requirements are obtained by the use of separate members which can be readily assembled and taken apart when required with the use of simple and readily available tools and which when assembled provide a coupling device securely attached to the cable.

The coupling device may be used with cables other than those intended for use with television cameras, being modified to suit the construction of the cable to which it is to be attached and the electrical conditions with which the coupling device is required to comply, there being no necessity, for example, to provide screening for some of the pins and the connections made therewith.

What we claim as our invention is:

1. A coupling part attached to the cut-back end of an electric cable and embodying a large number of contact members each of which is soldered to a cable conductor, the said coupling part comprising two rigid coaxially disposed insulating discs having a substantial thickness of wall and having registering apertures extending through the walls, a flexible sealing member interposed between the two discs, a contact member in each pair of registering apertures extending through a hole in the sealing member, an internal sleeve, a pair of coaxially disposed rings surrounding the cut-back end of the cable and mounted within the internal sleeve, the inner ring having a diameter smaller than that of the outer ring, means for holding the two rings together, the said rings forming a conductor clamp for some of the cable conductors, at least one screen-clamping ring surrounding the cut-back end of the cable for the clamping of a screen embodied in the cable, a sealing washer surrounding the cable, a ring surrounding the cable for maintaining the sealing washer under compression and an external sleeve surrounding the cut-back end of the cable and extending forwardly beyond that end, in which external sleeve, the two insulating discs, the flexible sealing member between those discs, the internal sleeve, the conductor clamp, screen-clamping ring and sealing washer are all housed and are readily removable from the external sleeve by an axial sliding movement of the latter, a ring surrounding the cut-back end of the cable engaging the external sleeve to press the internal sleeve towards the insulating discs, all the cable conductors extending from the cut-back end of the cable through the internal sleeve, the clamped conductors extending forwardly from the ring of larger diameter over the periphery of the ring of smaller diameter of the conductor clamp and at least some of the cable conductors extending into the apertures in the adjacent insulating disc and being there soldered to their respective contact members.

2. A coupling part attached to the cut-back end of an electric cable and embodying a large number of contact members each of which is soldered to a cable conductor, the said coupling part comprising two coaxially disposed insulating rings having registering apertures extending through the walls of the rings, a flexible sealing member interposed between the two rings, contact members in the registering apertures extending through holes in the sealing member, screen-supporting members between which the insulating rings are placed, the said screen-supporting members having projecting portions extending into coaxial holes in the insulating rings, a screen having a cylindrical wall surrounding the projecting portions of the screen-supporting members and extending through a coaxial hole in the flexible sealing member, the projecting portions of the screen-supporting members having registering apertures, contact members in those registering apertures, an internal sleeve, a two-part conductor clamp for the outer conductors of the cable, one part of said conductor clamp making a sliding fit within the internal sleeve and the other part, a loose fit within that sleeve, at least one clamping ring surrounding the cut-back end of the cable for the clamping of a screen embodied in the cable, a screw-threaded ring and a sealing washer and a further ring each surrounding the cable, the latter ring maintaining the sealing washer under compression, and an external sleeve surrounding the cable and extending forwardly beyond the cut-back end thereof, in which external sleeve the two insulating rings, the interposed flexible sealing member, the two screen-supporting members, the internal sleeve, the two-part conductor clamp, the clamping ring and the sealing washer are housed and are readily removable therefrom by an axial sliding movement of the external sleeve, the screw-threaded ring screwing to the external sleeve to press the interval sleeve towards the adjacent screen-supporting member, and all the cable conductors extending from the cut-back end of the cable through the internal sleeve and through the apertures in the adjacent screen-supporting member, some of the cable conductors extending into the apertures in the adjacent insulating ring and being there soldered to their respective contact members and other cable conductors extending into the apertures in the projecting portion of the adjacent screen-supporting member and being there soldered to their respective contact members.

References Cited in the file of this patent

UNITED STATES PATENTS

| | | |
|---|---|---|
| 2,498,589 | Steinke | Feb. 21, 1950 |
| 2,511,037 | Bedoiseau | June 13, 1950 |
| 2,521,822 | Boswell | Sept. 12, 1950 |
| 2,590,160 | Dixon | Mar. 25, 1952 |
| 2,605,315 | Hargett | July 29, 1952 |
| 2,662,219 | Hennessey | Dec. 8, 1953 |

FOREIGN PATENTS

| | | |
|---|---|---|
| 495,258 | Canada | Aug. 11, 1953 |
| 532,701 | Great Britain | Jan. 29, 1941 |
| 103,499 | Great Britain | Jan. 22, 1917 |